Aug. 10, 1965  D. S. CHISHOLM  3,200,028
HAND TOOL FOR SEALING THERMOPLASTIC SURFACED MEMBERS
Filed Oct. 6, 1961  2 Sheets-Sheet 1
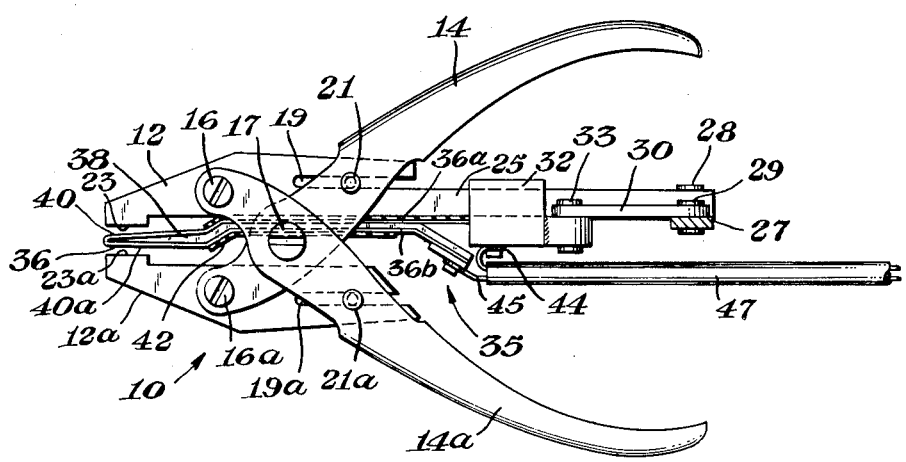
Fig. 1
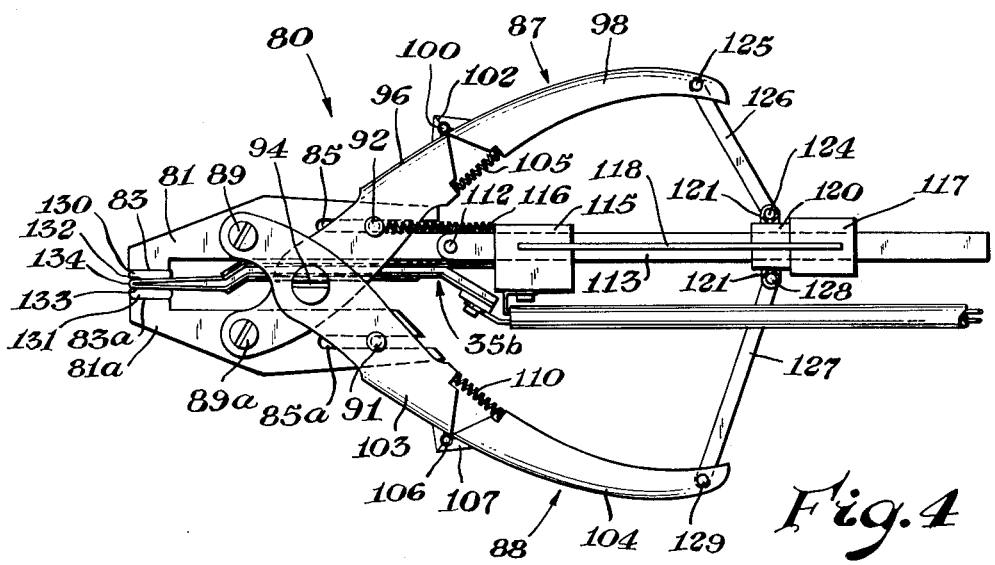
Fig. 4
Fig. 6
INVENTOR.
Douglas S. Chisholm
BY
AGENT Aug. 10, 1965    D. S. CHISHOLM    3,200,028
HAND TOOL FOR SEALING THERMOPLASTIC SURFACED MEMBERS
Filed Oct. 6, 1961    2 Sheets-Sheet 2
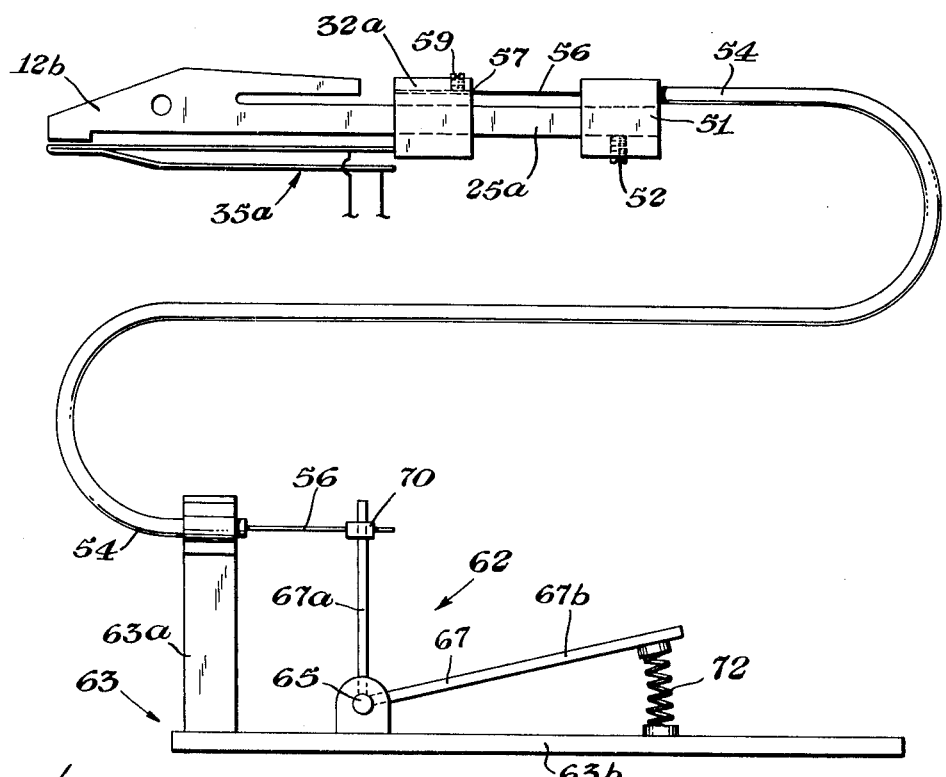
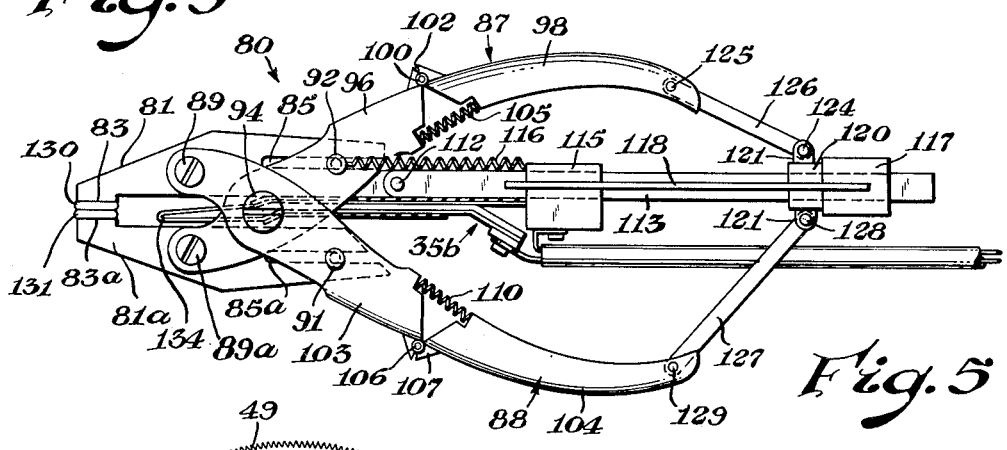
INVENTOR.
Douglas S. Chisholm
BY
Robert B...
AGENT

United States Patent Office 3,200,028
Patented Aug. 10, 1965

3,200,028
HAND TOOL FOR SEALING THERMOPLASTIC SURFACED MEMBERS
Douglas S. Chisholm, Midland, Mich., assignor to The Dow Chemical Company, Midland, Mich., a corporation of Delaware
Filed Oct. 6, 1961, Ser. No. 143,357
3 Claims. (Cl. 156—499)

This invention relates to the joining of members having thermoplastic surfaces. It more particularly relates to an apparatus and method of heat sealing sheet or strip material having themoplastic resinous surfaces.

Frequently, it is desirable and advantageous to join together thin strips or sheets of thermoplastic or thermoplastic faced resinous material at one or more locations. Conventionally, this is done by means of jaw, roller or band type of heat sealing equipment, which generally requires that the material to be joined be brought to the equipment. Such apparatus generally applies a pair of heated jaws, one on each side of the area to be joined, and the thermoplastic material is heated to a temperature which is sufficiently high to cause bonding or fusion of the two parts into one. Portable or manually operable equipment is usually of the fusion welding type wherein a hot gas blast is employed to melt a filler rod into the parts being joined. Methods and apparatus known to the art are particularly inconvenient and oftentimes inoperable when strips of themoplastic material or thermoplastic faced material are to be joined under tension or in confined quarters, for example, wherein a thermoplastic band is applied as a binding or strapping around a cylindrical or rectangular body. If a band or strapping is under tension, the heat applied to the outer surfaces must be sufficient to raise the inner surfaces to a heat sealing temperature. A tight band or strip is not obtained, as the tension which the band is under causes it to elongate, and on cooling, to be loose. Particularly difficult sealing problems are encountered wherein a tape, sheet, band or similar configuration has a thickness above two or three mils and has incorporated therein a resinous filamentary material such as cotton, rayon or similar non-thermoplastic reinforcing material. When two such members are heat sealed together, a relatively great amount of time is required if the outer surfaces of the members are heated and maintained at a temperature just below the decomposition point of the thermoplastic material until thermal conduction from the opposing heat supplying surfaces raises the temperature of the most remote portion of the body between the jaws to a heat sealing temperature. Such problems are also encountered in heavy thermoplastic surfaced paperboards, and the like. Fiber or filament reinforced thermoplastic tape is employed as stripping on certain packing cases and generally it is held in position by a clamped sheet metal sleeve or similar means. By present methods and apparatus, such a stripping is conveniently heat sealed when adjacent a container surface.

It is an object of this invention to provide an improved apparatus for the heat sealing of sheet material having a thermoplastic surface.

It is a further object of this invention to provide a method and apparatus for the heat sealing of sheet material by applying the heat directly to the surfaces being joined.

It is another object of this invention to provide an improved method and apparatus for the joining of thermoplastic surfaced sheet material while under tension.

It is an object of this invention to provide an improved manually operable tool for the joining of thermoplastic sheet material.

These benefits and other advantages are readily achieved in accordance with the invention by joining sheet material having at least one thermoplastic resinous surface, said thermoplastic resinous surface being positioned in facing opposed relationship; providing a conductive heat source disposed between said surfaces, applying a clamping pressure sufficient to prevent relative movement between said facing sheet portions to said sheet in the area of said heat source, heating said thermoplastic surface to a heat sealing temperature, withdrawing said heat source while maintaing clamping pressure sufficient to bring the heated surfaces together, and cooling said thermoplastic surface below said heat sealing temperature.

Also contemplated within the scope of the invention is a heat sealing tool comprising a pair of clamping members in operative combination with clamping member operating means, a heating means slidably positioned between said clamping members and means to withdraw said heating means from between at least a portion of said clamping members.

Further features and advantages of the invention will be more apparent in the following description and specification when taken in connection with the accompanying drawing wherein:

In FIGURE 1 is a plan view of a tool in accordance with the invention.

FIGURE 2 is a detailed view of a portion to FIGURE 1.

FIGURE 3 is an alternate embodiment of the tool of FIGURE 1.

FIGURES 4 and 5 depict a tool in accordance with the invention which requires only one hand for operation.

FIGURE 6 is a representation of two thermoplastic surfaced members heat sealed together in accordance with the invention.

In FIGURE 1 there is illustrated a tool in accordance with the invention generally indicated by the reference numeral 10. The tool 10 comprises a pair of clamping members 12 and 12a movable in parallel relationship to each other by handle members 14 and 14a. The clamping members or jaws 12 and 12a are pivotally connected to the handles 14a and 14 respectively by the pivots 16 and 16a. The handles 14 and 14a are held in pivotal relationship by the pivot pin 17. A slot 19 is provided in clamping member 12, and a corresponding slot 19a in clamping member 12a. Rigidly affixed to handle 14 is guide pin 21 freely slidable in slot 19 and a corresponding pin 21a secured to handle 14a is positioned in slot 19a. Clamping members 12 and 12a are provided with adjacent faces 23 and 23a, respectively. The jaw 12 differs from the jaw 12a by the inclusion of a jaw extension 25. A lever 27 is pivotally affixed to jaw extension 25 by means of a pivot 28. Spaced from the pivot 28 on the lever 27 is pivot 29 carrying an operating link 30. The end of the operating link 30 most remote from pivot 29 is secured to a sleeve 32 slidably mounted on the extension 25, by means of a pivot 33. Secured to and wholly supported by sleeve 32 is heating means generally indicated by the reference numeral 35. The heating means 35 comprises a generally U-shaped conductive member 36 formed from flat metal strip. Disposed within the U is an insulating means 38. The operating portion of the heating means 35 are the heat transfer surfaces 40 and 40a. Non-operating portions of the conductive member 36 are covered with an electrical and thermal insulating material 42. The generally U-shaped heating member 36 comprises two legs 36a and 36b. The legs 36a and 36b are connected to the conductors 44 and 45 of the power supply cable 47.

In FIGURE 2 there is illustrated a view of the operating assembly mounted on extension 25 viewed in the plane of the handles 14 and 14a. The view shows the sleeve 32 and its relationship to the link 30 and the pivots 29 and 33. Affixed to the lever 27 on its end most remote from the pivot 28 is a thumb spur 49 which is omitted from FIGURE 1 for the sake of clarity.

The tool 10 of FIGURE 1 is illustrated with the jaws 12 and 12a in the open position. In operation, one of the sheets to be joined is inserted between the clamping surface 23 and the heating surface 40. The other member to be joined is placed between the clamping surface 23a and the heating surface 40a. The handles 14 and 14a are moved toward each other causing the material to be firmly gripped between the surfaces 23 and 40 and 23a and 40a. A suitable electric current is caused to flow in the generally U shaped heating member 36 causing the heat exchange surfaces 40 and 40a to heat the material adjacent thereto to rise in temperature. When the temperature of the material is sufficient to cause the surface to be in a fluid or semi-fluid state, the lever 27 is moved to the rear, that is, away from the pivot point 17 and through the link 30 causing sleeve 32 to move rearward along the jaw extension 25 and withdrawing the healing assembly 35 from between the members being sealed. The current is then removed from the heating assembly 35 and the thermoplastic surface materials being joined are permitted to cool to a temperature below the semi-fluid point. By moving the handles 14 and 14a apart, the sealed sheet material is readily removed from the tool.

The alternate embodiment illustrated in FIGURE 3 is advantageously employed to replace the jaw 12 of FIGURE 1. The jaw 12b having an extension 25a is fitted with a slidable sleeve 32a which supports a heating assembly 35a, partly shown. The portion of 25a remote from the major portion of the jaw 12b is provided with a cable bearing block 51 held to the extension 25a by means of a set screw 52. The block 51 has rigidly affixed thereto a cable housing 54 through which passes a flexible cable 56 which in turn is secured to the sliding block 32a which is held into an opening 57 in the sliding block 32 by means of a set screw 59. The housing 54 remote from the jaw 12b is affixed to a pedal assembly generally designated by the reference numeral 62. The pedal assembly 62 comprises a bracket 63 having a vertical portion 63a and a horizontal portion 63b. Secured to the vertical portion 63a is the cable housing 54. A pivot 65 is affixed to the base member 63b. The pivot 65 carries a bell crank 67 having vertically extending arm 67a having horizontally extending arm 67b. The end of the operating cable 56 is secured to the arm 67a by means of the clamp 70. The arm 67b is urged upwardly by a compression spring 72.

In operation of the device of the modification of FIGURE 3, downward pressure applied to arm 67b by an operations foot or similar means will retract the operating cable 56 from the cable housing 54 which is rigidly secured to bracket 63. Withdrawal of the cable from the housing causes the sleeve 32a to be retracted toward the bearing block 51. Movement of the sleeve 32a causes withdrawal of the heating element in the manner similar to that of the embodiment shown in FIGURE 1. The embodiment of FIGURE 2 is particularly advantageous wherein sealing or welding is to be performed at a fixed location and frees one hand of the operator for additional functions.

In FIGURE 4 there is illustrated a tool generally designated by the reference numeral 80. The tool 80 comprises a pair of jaws 81 and 81a. The jaws 81 and 81a are each provided with gripping surfaces 83 and 83a, respectively. The jaws 81 and 81a are provided with slots 85 and 85a. Pivotally and rotatably affixed to the jaws are a pair of handles designated by the reference numerals 87 and 88. The handle 88 is pivotally attached to the jaw 81 by a pivot pin 89 and slidably attached to the jaw 81a by means of a pin 91 sliding in groove 85a. Handle 87 is pivotally attached to the jaw 81a by a pivot 89a and slidably attached to jaw 81 by a pin 92. Handles 87 and 88 have a common pivot 94 positioned between pivot and pins 89, 89a, 91 and 92 and between a common pivot 94 the jaws 81 and 81a. The handle 87 is divided into two portions, a jaw engaging portion 96 and an operating portion 98. The handle portions 96 and 98 are pivotally connected by a hinge means 100 having associated therewith a stop 102, remote from the hinge 100 is disposed a compression spring 105. Handle 88 is similarly divided into two portions, 103 and 104, attached by hinge 106 having associated therewith stop means 107 and a compression spring 110 is positioned remote from the hinge 102. Pivotally attached to clamping means 81 by means of joint 112 is a shaft 113. On shaft 113 is slidably mounted a sleeve 115. The sleeve 115 carries a heating assembly generally designated by the reference numeral 35b. Opposite ends of a tension spring 116 are secured to sleeve 115 and pin 92. The sleeve 115 is rigidly linked to a second slidable sleeve 117 by means of rod 118. Slidably located intermediate between the sleeves 115 and 117 is block 120 having ears 121 and 122. Ear 122 is connected by means of pivot pin 124 to link 126. The end of link 126 most remote from pivot 124 is pivotally attached to handle portion 98 by means of pivot pin 125. Similarly, the ear 121 is connected to the link 127 by means of pivot pin 128. The end of link 127 most remote from pivot pin 128 is connected to the handle portion 104 by means of pivot pin 129. Disposed between the gripping portions 83 and 83a are two sheet-like members 130 and 131 having thermoplastic surface portions 132 and 133. Disposed between the two strips 130 and 131 is a heating portion 134 of the heating assembly 35b. For the sake of greater clarity and the understanding of the operation of the embodiment of FIGURE 4, FIGURE 5 depicts the position and relationship of the handle portions 98, 104, and the heating assembly 35b when the handle portions are moved to retract the heater assembly.

The sealing operation of the embodiment of FIGURE 4 is substantially similar to that of FIGURE 1, but the withdrawal of the heating element 35b from between the strips 130 and 131 is adapted to be performed with one hand. When the handles 87 and 88 of the embodiment of FIGURE 4 are moved to a position most remote from a center line between them, the gripping surfaces 83 and 83a are at their widest separation. The sheets 130 and 131 are positioned on either side of the heating element 134 as the handles 87 and 88 are brought toward each other the heating element 134 is tightly sandwiched between the thermoplastic face strips 130 and 131 which in turn are held together by the gripping surfaces 83 and 83a. Current is then passed through the heating element 35b to heat-plastify the film, and after a suitable period of time has elapsed, the handle portions 98 and 104 are urged toward each other causing the compression springs 105 and 110 to be compressed and through the links 126 and 127 the sliding block 120 is urged rearward to engage the sleeve 117. As the handle portions 98 and 104 approach each other, the sleeve 120 and the sleeve 117 are forced away from pivot point 94 and the force applied to sleeve 117 is transmitted to sleeve 115 through link 118, thus pulling the heating means 35b from between the strips 130 and 131. Power is removed from the heating means 35b and pressure is maintained on the strips 130 and 131 for a suitable time until they have cooled sufficiently to form a bond. Once the heating element 35b has been retracted, the handle portions 98 and 104 may be released and permitted to return to the position where stops 100 and 107 are engaged and the tension spring 116 returns a now cold heating element to the edge of the strips 130 and 131. On further release of the handles 87 and 88, the strips 130 and 131 are removed from the jaws and the heating element is returned to its initial position.

In FIGURE 5 there is illustrated an isometric view of a pair of thermoplastic surfaced strips 140 and 141 joined together in the location designated by the reference numeral 143 in accordance with the present invention. In the area 143, the adjacent surface portion of the strips 140 and 141 were heated to the fluid stage and firmly placed together and cooled to give a continuous bond of solid thermoplastic material.

By way of further illustration, polyethylene coated rayon straps were joined together employing a tool substantially as illustrated in FIGURE 1. The coated rayon strip comprised 11 strands of multi-filament rayon weighing about 1.3 grams per foot and evenly coated with a linear polyethylene to a thickness of about 0.01 inch. The polyethylene coating weighed about ¾ of a gram per foot. The heating element of the tool was ⅜ of an inch wide and made of 0.01 inch thick type 430 stainless steel strip. The unfolded length of the uninsulated heating element was about 1 inch. In operation, a voltage of 1 volt was measured across the terminal portions of the element. The current at the heating element was 150 amperes. Current was permitted to flow for a period between about 1 and 3 seconds. Employing the above described tool and tape, seals were made which had a breaking strength of about 103 pounds. A portion of the unsealed tape broke under a load of about 365 pounds. Seals having greater areas are readily prepared by employing a tool which will provide a greater sealing area or by making multiple adjacent seals on the overlapping ends of sheets or tapes.

Beneficially, a variety of means may be employed to control the electrical current to the heating element where a large number of seals are to be made on like material, and conditions will be substantially constant. An automatic time switch may be installed which will provide a fixed current, for a fixed definite period of time, particularly suited to the material being sealed. Alternately, when a wide variety of thicknesses and types of thermoplastic material is employed, it is most advantageous to provide a manual switching arrangement wherein the heating cycle can be readily adjusted to the most suitable period of time based upon the operator's experience. When the sheet or strap comprises polymeric materials which have a relatively high thermal stability, high temperature heating periods are advantageously employed, whereas when polymeric materials, which have a marked tendency to decompose rapidly at elevated temperatures are utilized, lower temperatures and longer heating periods are beneficially employed for the preparation of seals in accordance with the invention.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, except as it is set forth and defined in the hereto appended claims.

I claim:

1. A heat sealing tool comprising a pair of generally opposed handles adapted to be clasped in one hand, said handles in operative engagement with a pair of jaws, said jaws adapted to clamp between them at least two layers of thermoplastic faced material, a generally flat heating member retractively disposed between said jaws, and in cooperative combination with a heat source and heating member retracting means, the handle portions are so constructed and arranged so as to move said jaws into engagement and subsequent movement of said handles in the jaw engaging direction restricts said heating means.

2. The apparatus of claim 1, wherein said jaws are so constructed and arranged as to move substantially parallel to each other.

3. The apparatus of claim 1, wherein said heating member comprises a flat, generally U shaped electrical resistance element.

References Cited by the Examiner

UNITED STATES PATENTS

| | | | |
|---|---|---|---|
| 2,367,725 | 1/45 | Lindh | 156—306 |
| 2,372,737 | 4/45 | Phillips | 156—306 X |
| 2,379,500 | 7/45 | Steffens | 156—322 X |
| 2,384,014 | 9/45 | Cutter | 156—499 X |
| 2,387,566 | 10/45 | Custers | 156—306 X |
| 2,438,685 | 3/48 | Stevens | 156—306 X |
| 2,441,817 | 5/48 | Huff | 156—579 |
| 2,514,092 | 7/50 | Reese | 156—322 |
| 2,579,088 | 12/51 | Piazze | 156—579 |
| 2,665,738 | 1/54 | Casken | 156—306 X |
| 2,715,087 | 8/55 | Barradas | 156—306 |
| 3,016,085 | 1/62 | Gassner | 156—499 X |

EARL M. BERGERT, *Primary Extminer.*